(12) United States Patent
Brodfuhrer et al.

(10) Patent No.: US 6,230,281 B1
(45) Date of Patent: May 8, 2001

(54) GEOGRAPHIC REDUNDANCY PROTECTION METHOD AND APPARATUS FOR A COMMUNICATIONS NETWORK

(75) Inventors: Russel E. Brodfuhrer, Shrewsbury, NJ (US); Shaun Cairns, Chippenham (GB); Michael P. Fleisch, Aberdeen, NJ (US); David George Gourley, Bath (GB); Simon Mark Pearcey, Malmesbury (GB); P. Nigel Pennington, Chippenham (GB)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/140,272

(22) Filed: Aug. 26, 1998

(51) Int. Cl.[7] .............................. H02H 3/05; G06F 15/173
(52) U.S. Cl. ................................................. 714/4; 709/242
(58) Field of Search .................................. 714/4; 709/202, 709/242

(56) References Cited

U.S. PATENT DOCUMENTS 4,625,082 * 11/1986 Kelly ..................................... 379/273
5,796,934 * 8/1998 Bhanot et al. ............................. 714/4
6,014,753 * 1/2000 Miyamoto et al. ....................... 714/4

FOREIGN PATENT DOCUMENTS

| 0 147 046 A2 | 3/1985 | (EP) . |
| 2 244 628 | 12/1991 | (GB) . |
| 2 272 611 | 5/1994 | (GB) . |

* cited by examiner

Primary Examiner—Krisna Lim
(74) Attorney, Agent, or Firm—Synnestvedt & Lechner LLP

(57) ABSTRACT

A method and apparatus for providing back-up management of a network element in a multi-tiered network management system. Network elements have a primary element manager responsible for managing communications with that network element and a secondary element manager that can be at a geographically remote location responsible for assuming control of communications with the network element should the primary element manager become unable to do so.

52 Claims, 10 Drawing Sheets

GEOGRAPHIC REDUNDANCY PROTECTION METHOD AND APPARATUS FOR A COMMUNICATIONS NETWORK

FIELD OF THE INVENTION

The invention pertains to communications networks. More particularly, the invention pertains to a method and apparatus for providing back-up redundancy to keep a network in full operation when a manager node on the network becomes disabled.

BACKGROUND OF THE INVENTION

A communications network typically comprises a plurality of network elements which conduct communications over the network. Using a local area network (LAN) of a business office as an example, a personal computer (PC) sitting on someone's desk is a network element. It communicates with other network elements to exchange data, such as communicating with another desktop PC via interoffice e-mail or retrieving a word processing document from a data server on the network.

The network also includes element managers 4a–4c, the function of which is to control communications between the network elements on the network and are generally invisible to the user of a network element. Each element manager is responsible for controlling a subset of the network elements. In large networks, there may be an even higher control node, termed a network manager, which is in communication with the element managers and generally acts as a manager for the element managers.

The present application is primarily concerned with these larger type networks in which a plurality of element managers each control a plurality of network elements. In such networks, it is frequently desirable to have some type of back-up system to allow network elements to continue to operate even if the element manager which is responsible for controlling the element cannot do so, for instance, due to the manager becoming disabled or due to a fault in the communication path between the manager and the agent.

In one known redundancy back-up scheme, all of the hardware of the manager and/or the data required by the manager for proper operation of the network is duplicated. Thus, if the primary hardware becomes disabled, the secondary hardware simply takes over and keeps the element manager in operation. Such schemes are typically extremely limited in how far apart the two sets of hardware can be from each other due at least to cabling requirements.

One problem with this prior art back-up scheme is that the back-up hardware system is essentially in the same location as the primary system. Accordingly, they cannot offer protection in situations where the cause of the disablement of the primary system is an external force which effects the entire locale. Examples of such events include fire, natural disaster, insurrection and other wartime calamities. Such events are of particular concern in developing nations.

Another known scheme involves having duplicate hardware at a remote location and replicating part of the application data over a high speed link. If the hardware at the primary location fails, the secondary hardware at the remote location can take over using the replicated data. Such schemes suffer from the need of a costly high speed data link between the primary hardware and the remote backup hardware. Also, this type of backup scheme is only possible with limited types of networks.

Accordingly, it is an object of the present invention to provide an improved communications network.

It is another object of the present invention to provide an improved back-up scheme for a communications network.

It is yet another object of the present invention to provide a back-up scheme for a communications network wherein the back-up hardware is at a geographically distant location from the primary hardware.

It is a further object of the present invention to provide a remote geographic redundancy scheme for shifting control of network elements from a disabled network manager to one or more other element manager sites.

SUMMARY OF THE INVENTION

The invention is a redundant control scheme for keeping channels of communication with a network element open even when the element manager node that has primary responsibility for controlling communications with that network element is disabled. In particular, each element manager is responsible for controlling one or more network elements. The collection of network elements for which a manager is responsible is termed that manager's domain. A manager's domain comprises two sub-domains (herein all domains and sub-domains are generically referred to as "domains"), namely a primary domain and a secondary domain. A manager's primary domain comprises the network elements for which that element manager has primary responsibility. A manager's secondary domain comprises network elements for which one or more other element managers have primary responsibility, but for which the manager will assume responsibility in the event that the primary manager of that network element becomes disabled. A domain may comprise a geographic area. The primary domain is further broken down into a protected primary domain and a not-protected domain. The protected primary domain comprises all network elements which are participating in the geographic redundancy scheme of the present invention. The not-protected primary domain comprises all network elements which are not participating in the geographic redundancy scheme.

Every network element participating in the geographic redundancy scheme of the present invention has one primary manager and one secondary manager. When an element manager cannot control one or more of the network elements for which it is primarily responsible, the element managers that are secondary managers for those one or more network elements detect this situation through one of several possible mechanisms. For example, every secondary manager is equipped to poll at fixed intervals the primary manager or managers of all of the network elements in its secondary domain to determine if they are still operating. If the secondary manager detects that a primary manager has not responded to the polling for a predetermined period of time, it assumes that the non-responsive manager is not operating and attempts to gain control of the relevant network elements. The primary manager also may automatically request the secondary manager to assume control of a network element if it cannot communicate with one of its network elements. A control switch also can be effected manually through the primary manager.

Regardless of the mechanism by which a control switch to the secondary manager is initiated, the secondary manager attempts to gain control of the network elements in its secondary domain for which the disabled primary element manager was responsible by requesting the network element to recognize the secondary manager as its manager and to send the secondary manager a complete copy of its MIB data.

Prior to assuming control of a network element in its secondary domain, the only data stored at the secondary manager pertaining to that network element are 1) the identity of that network element's primary manager and 2) a copy of the primary element manager's network level data for the given network element.

The secondary managers are primary managers of other network elements in the network. Accordingly, very little, if any, additional hardware is employed to implement this redundancy scheme since the backup managers already are part of the network. Also, the secondary managers can be geographically remote from the primary managers, providing insurance against network failure in the event of failure events that effect entire geographic areas, such as natural disaster or insurrection.

DETAILED DESCRIPTION OF PREFERRED EMBODIMENTS OF THE INVENTION

I. Network Organization

Figure 1:
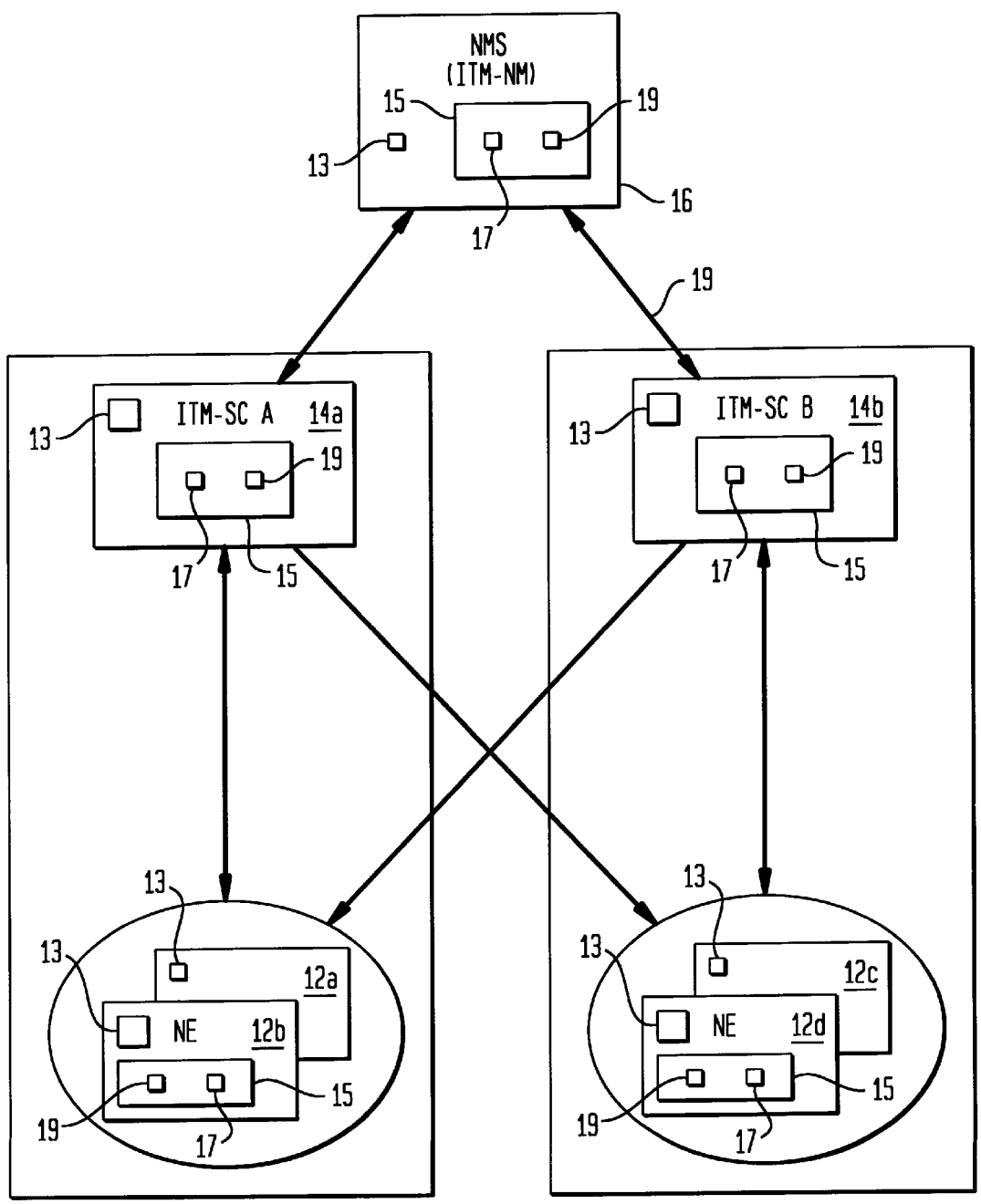
FIG. 1 is a block diagram of a communications network of the prior art.
Figure 2:
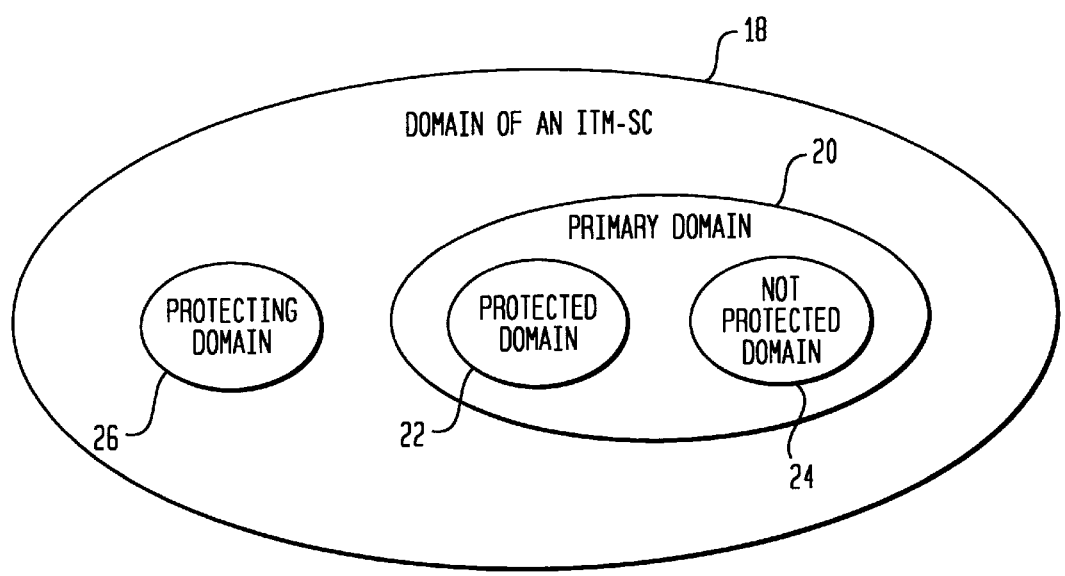
FIG. 2 is a block diagram illustrating the overall geographic redundancy scheme in accordance with the present invention.

FIG. 2 illustrates a multi-tiered network 10 in accordance with the present invention. The present invention is particularly adapted for very large scale communications networks operating over a substantial geographic area, such as a national military communication network. Network elements 12 are the communication nodes of the network 10. Element managers 14 control the network elements and particularly communication between the network elements in the network 10. The element managers 14 are herein termed integrated transport management subnetwork controllers (or ITM-SC [trademark of Lucent Technologies]). Further, the embodiments described herein specifically pertain to a network in accordance with the ITU-T international standards, which is incorporated herein by reference, and particularly sections x217 and x.700 et seq. It should be understood, however, that the invention is not limited to networks in accordance with the aforementioned standard or to the specific embodiments described herein, which are merely exemplary and not limiting.

Each ITM-SC typically is responsible for controlling multiple network elements. For instance, ITM-SC 14a is responsible for controlling network elements 12a and 12b, while ITM-SC 14b is responsible for controlling network elements 12c and 12d.

The ITM-SCs 14 are under the control of a network manager 16 (ITM-NM) which, in the illustrated embodiment, controls all of the ITM-SCs and thus the entire network. Typically, a person, the network user 17, is stationed at the ITM-NM to monitor the network operation and manually control the ITM-NM or any of the ITM-SCs should the need arise. Typically, each of the network nodes 12, 14, 16 contains a processing unit 13 for executing software necessary to perform its function on the network, and a memory 15 for storing the software for operating the network node. The memory usually comprises both ROM (Read Only Memory) 17 for storage of unalterable software as well as RAM 19 (Random Access Memory) for storage of changeable data as well as changeable software.

II. Organization of ITM-SC Domains

Figure 3:
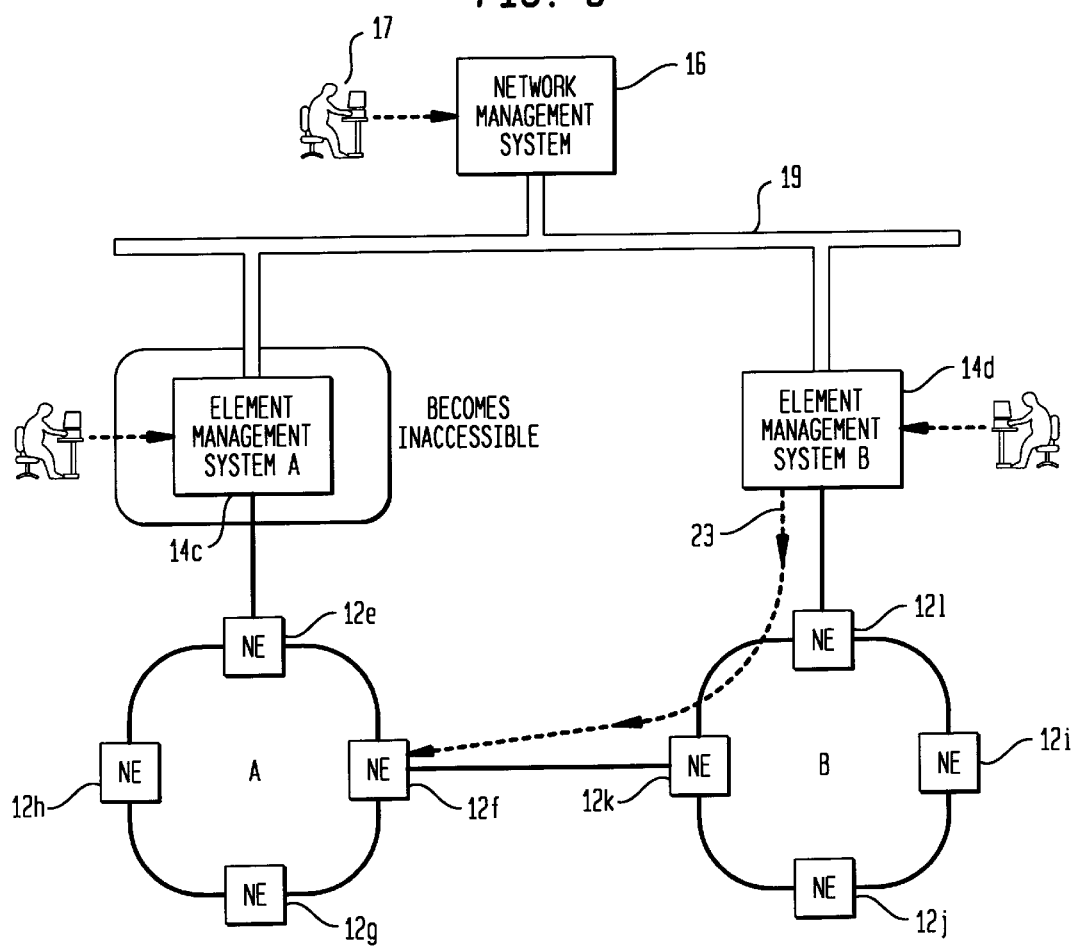
FIG. 3 is a block diagram of a network in accordance with the present invention.

With reference to FIG. 3, the collection of network elements for which a given ITM-SC is actually or potentially responsible is termed herein that ITM-SC's domain. In a preferred embodiment of the invention, the network elements in an ITM-SC's domain are within a specified geographic area. In accordance with the geographic redundancy scheme of the present invention, an ITM-SC's domain is broken down into sub-domains. Namely, those network elements for which an ITM-SC is primarily responsible for controlling are in the primary domain 20 of the ITM-SC. The primary domain 20 has two further sub-domains, a protected domain 22 and a not-protected domain 24. Those network elements participating in the geographic redundancy scheme of the present invention are in the protected primary domain. This means that control of those network elements can be transferred to the control of a secondary ITM-SC should a problem arise with the control of the network elements by the primary ITM-SC. Those network elements which are not participating in the geographic redundancy scheme of the present invention are in the not-protected domain 24. If the particular ITM-SC also is participating in the geographic redundancy scheme as the secondary ITM-SC for network elements which are in the primary protected domain 22 of another ITM-SC on the network, this ITM-SC will also have a protecting domain 26. As long as they continue to participate in the geographic redundancy scheme, the network elements that are in this ITM-SC's protecting domain 26 will remain there, even if this ITM-SC assumes control thereover.

As explained more fully below, in the preferred embodiment of the invention, once a secondary ITM-SC gains control over a network element, control can revert back to the primary ITM-SC only under manual instruction of the ITM-SC user 17. The network elements in an ITM-SC's protected primary domain 22 may be protected by separate secondary ITM-SC's. That is, for instance, network element 12a in FIG. 2 may be in ITM-SC 14b's protecting domain, while network element 12b is in ITM-SC 14c's protecting domain. However, each network element may have only one primary ITM-SC and one secondary ITM-SC.

Likewise, network elements in the protecting domain 26 of an ITM-SC may be in the protected primary domain 24 of different primary ITM-SC's. Thus, for example, ITM-SC A in FIG. 2 may be the secondary manager for network element 12d as well as network element 12e.

In a preferred embodiment, the primary manager (or ITM-SC) of a network element must be the ITM-SC on which that network element was created.

In the preferred embodiment, there is a communication path from the secondary ITM-SC to each of the network elements in its protecting domain 26 that is other than through the primary manager for that network element. For example, ITM-SC 14d in FIG. 3 can communicate with network element 12f, which is in its protecting domain 26, via network gateway path 23 through network elements 12l and 12k, without involving ITM-SC 14c.

Further, there is a peer to peer communication link between each secondary ITM-SC and the primary ITM-SCs whose network elements it is protecting. FIG. 2 illustrates one example of a peer to peer communication path between two ITM-SCs involving a direct link 21. FIG. 3 illustrates another option in which a bus 19 exists between the ITM-NM and all ITM-SCs. As described more fully below, only minimal data need be exchanged between the primary and secondary ITM-SCs and, therefore, the link therebetween may be of a low bandwidth and, in fact, may comprise a data path which already exists for other purposes unrelated to the present invention.

Upon creation, a network element enters the not-protected domain 24 of the ITM-SC on which it was created (which will be its primary ITM-SC). When the network element is placed in the geographic redundancy scheme, it is transferred to the protected domain 22 of the primary ITM-SC. Also, when a network element enters the geographic redundancy scheme, it is assigned a secondary ITM-SC that preferably is geographically remote from the network element's primary ITM-SC. The secondary manager of a network element may be up to at least 1,000 kilometers from the primary manager and quite likely much further. The maximum distance between the primary and secondary managers of an element is limited only by typical network considerations pertaining to the distances between nodes. The present invention imposes no additional limitations.

In order for the geographic redundancy scheme to work effectively, an ITM-SC should have fewer network elements in its primary domain 20 than its maximum capability. In this manner, should it be necessary to take over control of network elements in its protecting domain, it can do so without significant degradation of performance. For instance, in a preferred embodiment of the invention, an ITM-SC is capable of handling 120 network elements effectively. Accordingly, a maximum of only 60 network elements are assigned to each ITM-SC's primary domain. Also, preferably, only 60 network elements may be in its protecting domain 26.

III. Object Attributes Pertaining to Geographic Redundancy

So that the ITM-SCs and the ITM-NM may have sufficient information to carry out the geographic redundancy scheme effectively, the ITM-SCs store (for example, in a database in RAM 19) three state attributes corresponding to each network element in its domain 18. They are 1) management control status, 2) protection switch status, and 3) geographic redundancy set up status.

The geographic redundancy set up status indicates the status of the network element within the overall protection scheme, i.e., is a network element protected by a secondary ITM-SC and what is the status of that protection? There are three possible states of the geographic redundancy set up status, namely, 1) not-protected, 2) protected, and 3) protected disabled. When viewed from its primary ITM-SC, the meaning of the geographic redundancy set up status of a network element is as follows:

| | |
|---|---|
| Not Protected | The network element has no secondary ITM-SC assigned to protect it, i.e., the network element is not participating in the geographic redundancy scheme and is in the ITM-SC's not-protected domain 24. |
| Protected | The network element is currently protected by a secondary ITM-SC. The network element is in the primary ITM-SC's protected domain 22. |
| Protected Disabled | The protection of the network element is currently disabled, but the network element is part of the protected domain 22 of the primary ITM-SC. (A user may manually switch a network element from protected to protected disabled). |

When seen from the viewpoint of the secondary ITM-SC of a network element, the geographic redundancy set up status means the following:

| | |
|---|---|
| Protecting | The network element is being protected by the secondary ITM-SC and, therefore is in the secondary ITM-SC's protecting domain 26. This attribute does not indicate whether the secondary ITM-SC is actually managing the network element. |
| Protecting Disabled | The protection afforded by the secondary ITM-SC is currently disabled. |

Figure 4A:
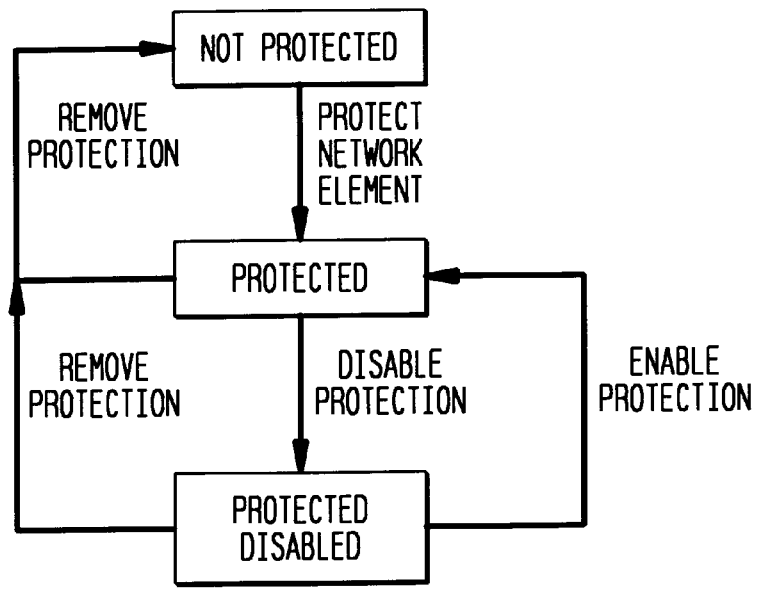
FIG. 4a is a state transition diagram of the set-up status attribute of a primary element manager in accordance with the present invention.
Figure 4B:
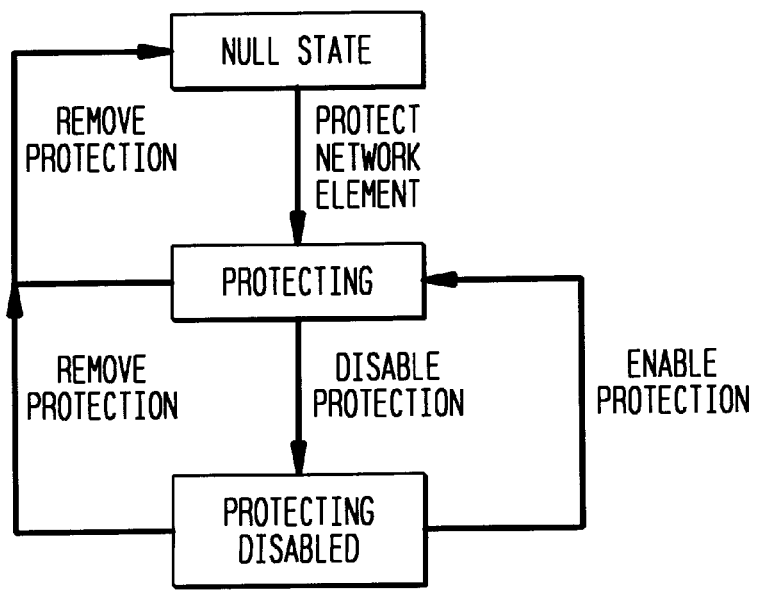
FIG. 4b is a state transition diagram of the set-up status attribute of a secondary element manager in accordance with the present invention.

FIGS. 4a and 4b illustrative the state transitions as described above for the geographic redundancy set-up status.

The management control status attribute defines whether an ITM-SC believes it is managing a network element or its peer is managing the network element. When viewed from the viewpoint of the network element's primary ITM-SC, there are two possible management control status states, Actively managing and No Control, having the following meanings:

| | |
|---|---|
| Actively Managing | The primary ITM-SC has management control of the network element. This attribute value is entered by the primary ITM-SC when the primary ITM-SC first enters the geographic redundancy scheme or resumes control of a network element. This state is irrelevant to the association state of the ITM-SC to the network element. |
| No Control | The ITM-SC does not have control of the network element nor is it expected to be trying to gain control. |

From the viewpoint of the network element's secondary ITM-SC, the following states, having the following meanings, are possible:

| | |
|---|---|
| Actively Managing | The secondary ITM-SC currently has management control of the network element. The attribute value is changed to actively managing by the secondary ITM-SC when it gains its first association after a switch |
| Expecting Management | The secondary ITM-SC is currently trying to gain management control (i.e., to enter the actively managing state) by issuing association requests to the network element. |
| No Control | The secondary ITM-SC does not have nor is it trying to gain control of the network element. |

The Actively Managing state of the management control status attribute tells the ITM-SC user 17 and the ITM-NM that all communications with the network element should be through that ITM-SC. The Expecting Management state of the management control status attribute is a temporary state which occurs between the time a secondary ITM-SC is requested to take control of a network element and the time it actually makes an association with that network element.

In a preferred embodiment of the invention, there is no automatic reversion of control of a network element to the primary ITM-SC when the primary ITM-SC comes back on line, but instead control can only be returned from the secondary ITM-SC to the primary ITM-SC by manual control by the user 17. Accordingly, once a network element's secondary ITM-SC has entered the Actively Managing state, the management control status attribute will never revert to Expecting Management. The Expecting Management state can be reached only from the No Control state.

The management control status attribute is a separate attribute from the network element association attribute since the association state of a network element does not contain all the information as to what ITM-SC is managing and/or attempting to gain management of the network element.

Figure 5A:
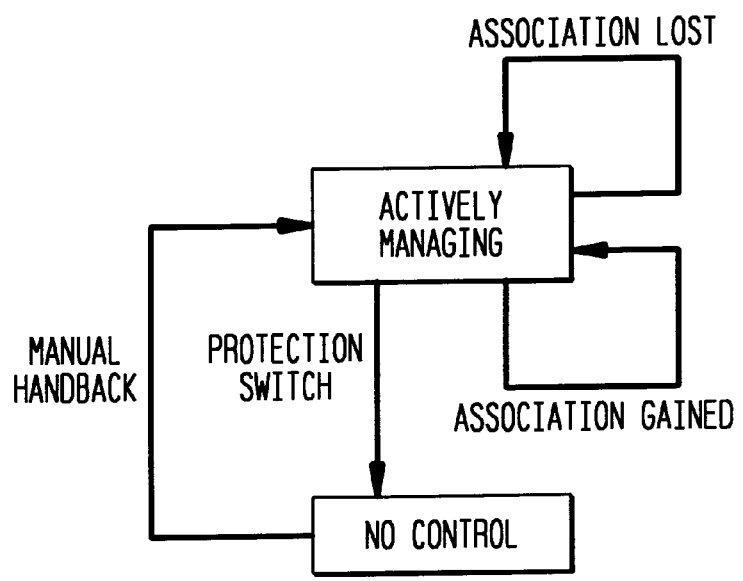
FIG. 5a is a state diagram of the management control status attribute for a primary element manager in accordance with the present invention.
Figure 5B:
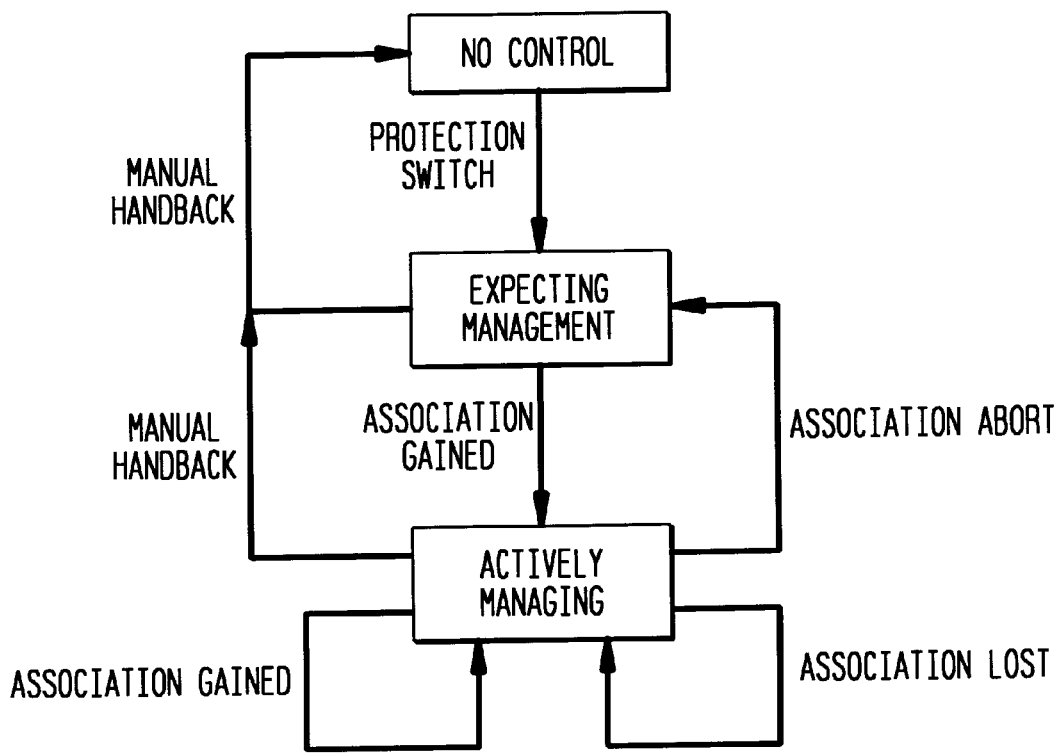
FIG. 5b is a state diagram of the management control status attribute for a secondary element manager in accordance with the present invention.

FIGS. 5a and 5b illustrate the state transitions as described above for the management control status attributes.

The protection switch status attribute indicates whether there has been a switch of control from the primary ITM-SC to the secondary ITM-SC as well as the nature of the protection switch. The protection switch status attribute has three states, which, as with the two above-discussed attributes, have different meaning to an ITM-SC depending on whether it is the network element's primary or secondary ITM-SC. The three states are Manual, Automatic and No Switch. As previously noted, a switch in control of a network element from its primary to its secondary ITM-SC can be accomplished manually. Also, as described more fully below, it can happen automatically, such as, for instance, when a secondary ITM-SC can no longer confirm the operation of a primary ITM-SC or a primary ITM-SC can no longer confirm its association with a network element in its primary protected domain.

The states of the protection switch status attribute have the following meaning:

| | |
|---|---|
| Manual | The primary ITM-SC user 17 instigated the protection switch for a network element and the secondary ITM-SC is expected to have management control, i.e., have a management control status of Actively Managing and the primary ITM-SC is expected to have a management control status of No Control. |
| Automatic | The secondary or primary ITM-SC automatically instigated the protection switch for a network element. The secondary ITM-SC is expected to have management control, i.e., have a management control status of Actively Managing and the primary ITM-SC is expected to have a management control status of No Control. |
| No Switch | Normal operation. The primary ITM-SC has a management control status of Actively Managing while the secondary ITM-SC has a management control status of No Control. |

Figure 6:
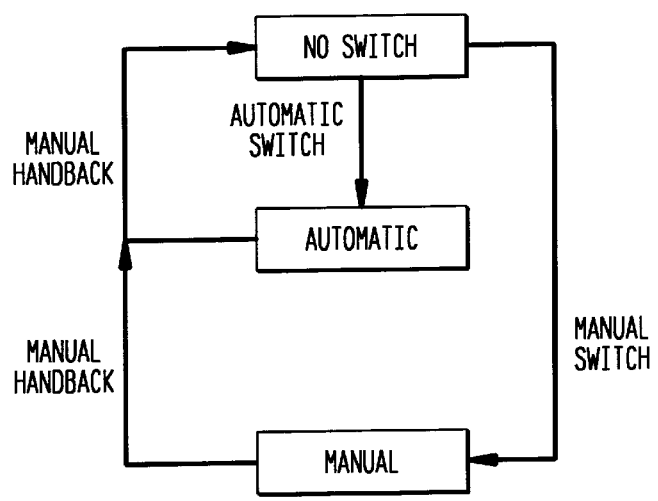
FIG. 6 is a state diagram of the protection switch status attribute for an element manager in accordance with the present invention.

FIG. 6 illustrates the state transitions as described above for the protection switch status attribute.

IV. Operation of Geographic Redundancy Method and Apparatus

FIG. 3 shows an exemplary network and illustrates operation of the geographic redundancy scheme.

In a preferred embodiment of the present invention, the ITM-NM 16 is unaware of the operation of the geographic redundancy scheme. The ITM-NM 16 stores in its databases in RAM 19 data only sufficient to know what ITM-SCs are managing what network elements. Particularly, an ITM-SC 14 provides the ITM-NM 16 only with information as to a loss of association with a network element and an instruction identifying whether it does or does not have management control of a network element.

In the present invention, the secondary ITM-SC for a network element maintains a copy only of the primary ITM-SC's network level data for each network element in the secondary ITM-SC's protecting domain 26. Specifically, in order to maintain a current copy of the primary ITM-SC's network level data, the primary ITM-SC sends a message containing its network level data to the secondary ITM-SC after each time it updates its own database with new network level data.

In a preferred embodiment of the invention, a geographic redundancy event log is maintained in RAM 19 of each ITM-SC to store all events in which one of the three above-mentioned attributes, i.e., geographic redundancy set-up status, geographic redundancy protection switch status, and geographic redundancy management control status is effected. In the preferred embodiment, the event log is maintained in a circular buffer which will be able to hold about 3,000 entries. This will allow, for instance, 120 network elements to enter up to 25 entries each in the log.

A. Initialization of a Network Element into Geographic Redundancy Scheme

Figure 7:
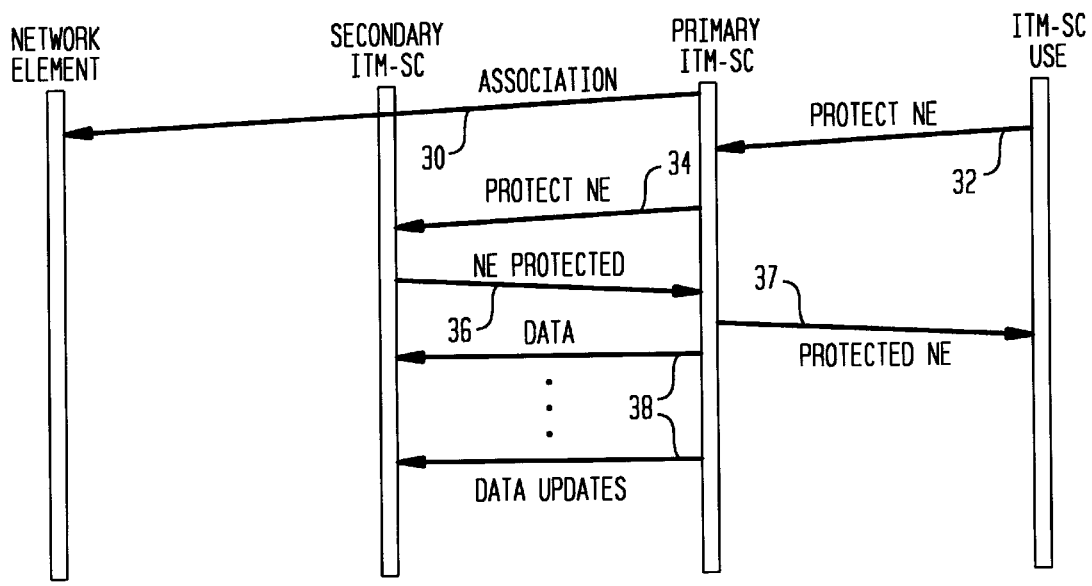
FIG. 7 is a message flow diagram illustrating an initialization of a network element into the geographic redundancy scheme in accordance with the present invention.

FIG. 7 is a message flow diagram illustrating the initialization of a network element into the geographic redundancy scheme. Nothing can occur in connection with the geographic redundancy scheme of the present invention before an ITM-SC establishes an association with a network element (and thus becomes its primary ITM-SC), as shown at 30. The ITM-SC user 17 initiates entry of a network element into the geographic redundancy scheme of the present invention by sending an instruction 32 to the primary ITM-SC of a given network element instructing it to enter that network element into the geographic redundancy scheme. In one preferred embodiment of the invention, the instruction identifies the ITM-SC which is to be the secondary ITM-SC. Alternately, there may be software in the primary ITM-SC that selects an appropriate secondary ITM-SC based on conditions such as geographic location and/or other security considerations. The primary ITM-SC then sends a message over the peer-to-peer communication link, eg., link 19 (see FIG. 3) or link 21 (see FIG. 2) to the selected secondary ITM-SC requesting that it become the secondary manager of the selected network element. Preferably, each individual network element is entered into the geographic redundancy scheme separately. Thus, each such instruction will pertain to a single network element.

The primary ITM-SC might reject the protection request from the user 17 under certain circumstances. For instance, the network element may already be in the geographic redundancy scheme and have a different secondary ITM-SC. In the example illustrated by FIG. 7, however, no such conditions exist. Therefore, the primary ITM-SC then sends an instruction 34 over connection 19 or 21 to the selected secondary ITM-SC requesting that it protect the network element. The instruction includes, inter alia, the name and type of the network element to be protected and the gateway address that the secondary ITM-SC should use to communicate with the network element. The secondary ITM-SC normally replies with an acknowledge message 36, as shown. Alternately, however, the secondary ITM-SC could reply with a refusal to protect the network element. For instance, this may occur when the secondary ITM-SC is already protecting the maximum number of network elements allowed or it has a network element of the same name.

Once the acknowledgement 36 has been received, the primary ITM-SC sends a report 37 to the user that the network element is now protected. For instance, the user 17 preferably interacts with the primary ITM-SC through a graphical user interface (GUI). It also sends all of its network level data for the identified network element to the secondary ITM-SC, as shown at 38. Every time thereafter that the primary ITM-SC updates its network level data for that network element, the primary ITM-SC will forward the updated network level data to the secondary ITM-SC. However, in at least one preferred embodiment of the invention, MIB data, PM data or alarm data updates are not reported to the secondary ITM-SC. This is preferred because alarm and PM data occur very frequently and, due to their large volumes, could significantly degrade performance.

B. ITM-NM and ITM-SC Communications

Only the ITM-SC that is actively managing a network element shall forward information about the network element to the ITM-NM. However, due to potential race conditions, an ITM-NM could be unsure which ITM-SC is actively managing a network element. For instance, a message to the ITM-NM may be delayed by a transmission queue or other traffic problem or may simply be lost, leaving the ITM-NM with incorrect or incomplete data as to which ITM-SC is managing a network element. Accordingly, an ITM-NM can send a request to an ITM-SC to confirm management control of a particular network element. Specifically, in a preferred embodiment, the ITM-NM is equipped to send an unsolicited message to an ITM-SC requesting information as to management control of any network element. The ITM-SC will ignore the message if it does not have management control of the identified network element. Otherwise, it will respond with a message to the ITM-NM informing it that it is managing the network element.

Particularly, the response message contains two fields, namely, the controller field and the originator field. The originator field contains the name of the network element's primary ITM-SC and the controller field contains the name of the ITM-SC that currently is managing the network element.

When management control of a network element is transferred from a primary to a secondary ITM-SC, the secondary ITM-SC automatically notifies the ITM-NM that it has management control of the network element.

C. Operation When a Manager Losses Association with a Network Element

Figure 8:
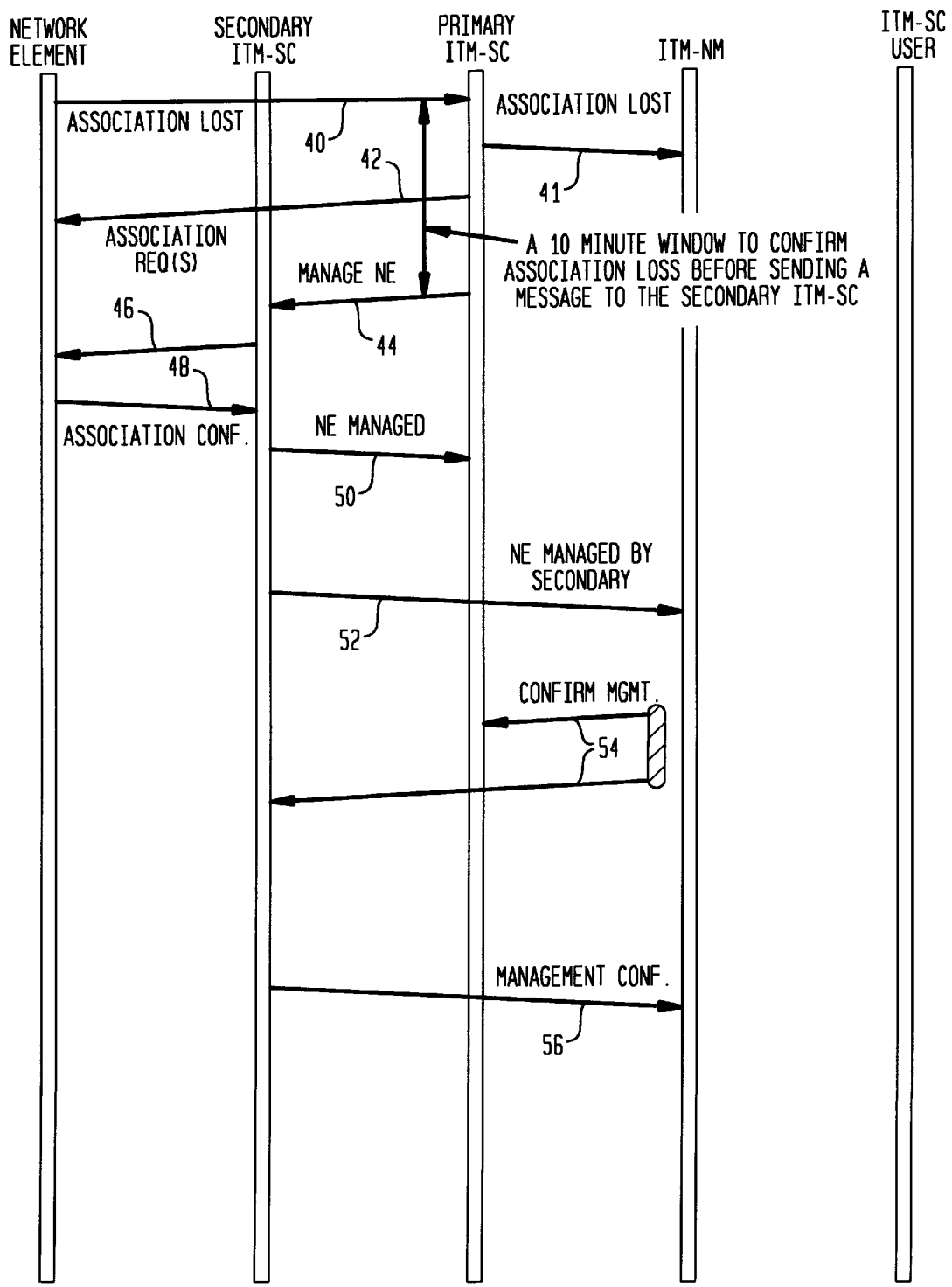
FIG. 8 is a message flow diagram illustrating operation in accordance with the present invention in the event of a communication link breakdown between a primary element manager and one of its managed network elements.

FIG. 8 is a message flow diagram illustrating operation when an ITM-SC is still operational but loses association with a network element. Such a condition may exist if the gateway path from the primary ITM-SC to the particular network element is lost, but there is no fault condition at either the ITM-SC or the network element. If association is lost, as shown at 40, the primary ITM-SC will send out one or more association requests 42 to the network element in an attempt to regain association. The primary ITM-SC also will send a message 41 to the ITM-NM informing it of the association loss. If association cannot be re-established within ten minutes of the loss, the primary ITM-SC will then send a request 44 to the secondary ITM-SC asking it to assume management of the particular network element. The secondary ITM-SC has two minutes to gain control of the network element. The secondary ITM-SC will send a message 46 through the gateway path that was stored in the database of the secondary ITM-SC when the network element entered the geographic redundancy scheme to the network element requesting association. If successful, as illustrated in FIG. 8, the network element returns an association confirm message 48 to the secondary ITM-SC.

If, on the other hand, the secondary fails to gain association within the two minute window, the primary ITM-SC will again try to associate with the network element for ten minutes. If that fails, the primary ITM-SC will again request the secondary ITM-SC to gain control, starting the cycle over again. If the secondary ITM-SC cannot gain association within the second two minute interval, it ceases the attempt to gain association and informs the primary ITM-SC that association is not possible. Possible reasons for the failure of both the primary and the secondary ITM-SC to gain association of the network element include: (1) communication link to the network element is down; (2) the network element is not responding; (3) the network element is currently managed by another ITM-SC; (4) the network element is unable to process the request in the necessary time frame.

Assuming that the secondary ITM-SC does gain an association as illustrated in FIG. 8, the secondary ITM-SC then sends a message 50 to the primary ITM-SC informing it that it is now managing the network element. It also sends a message 52 to the ITM-NM indicating that it now has management control of the network element.

If, for instance, the ITM-NM cannot determine which ITM-SC is managing the network element, it may send a confirm management message 54 to both of the ITM-SC's as discussed in more detail above. Only the secondary ITM-SC will respond with a management confirmation message 56.

When a primary ITM-SC requests a secondary ITM-SC to take control (e.g., 44 in FIG. 8), it changes its geographic redundancy protection switch status for that network element from No Switch to Automatic and its management control status from Controlling to No Control. The secondary ITM-SC, receiving the request to manage 44, changes its geographic redundancy protection switch for the network element from No Switch to Automatic and the management control status from No Control to Expecting Management. If and when the secondary ITM-SC receives an association confirmation (e.g., 48 in FIG. 8), it will then further change its management control status from Expecting Management to Actively Managing. If the attempt to gain association (e.g., 46 in FIG. 8) fails after two minutes of attempts, the secondary ITM-SC will change its protection switch status from Automatic back to No Switch and its management control status from Expecting Management back to No Control. If the primary ITM-SC does not receive, within two minutes of its request 44, a message (e.g., message 50 in FIG. 8) from the secondary manager confirming that it has obtained control, it will set its protection switch status back from Automatic to No Switch and its management control status from No Control back to Actively Managing.

D. Operation When a Manager Peer to Peer Link is Lost

Figure 9:
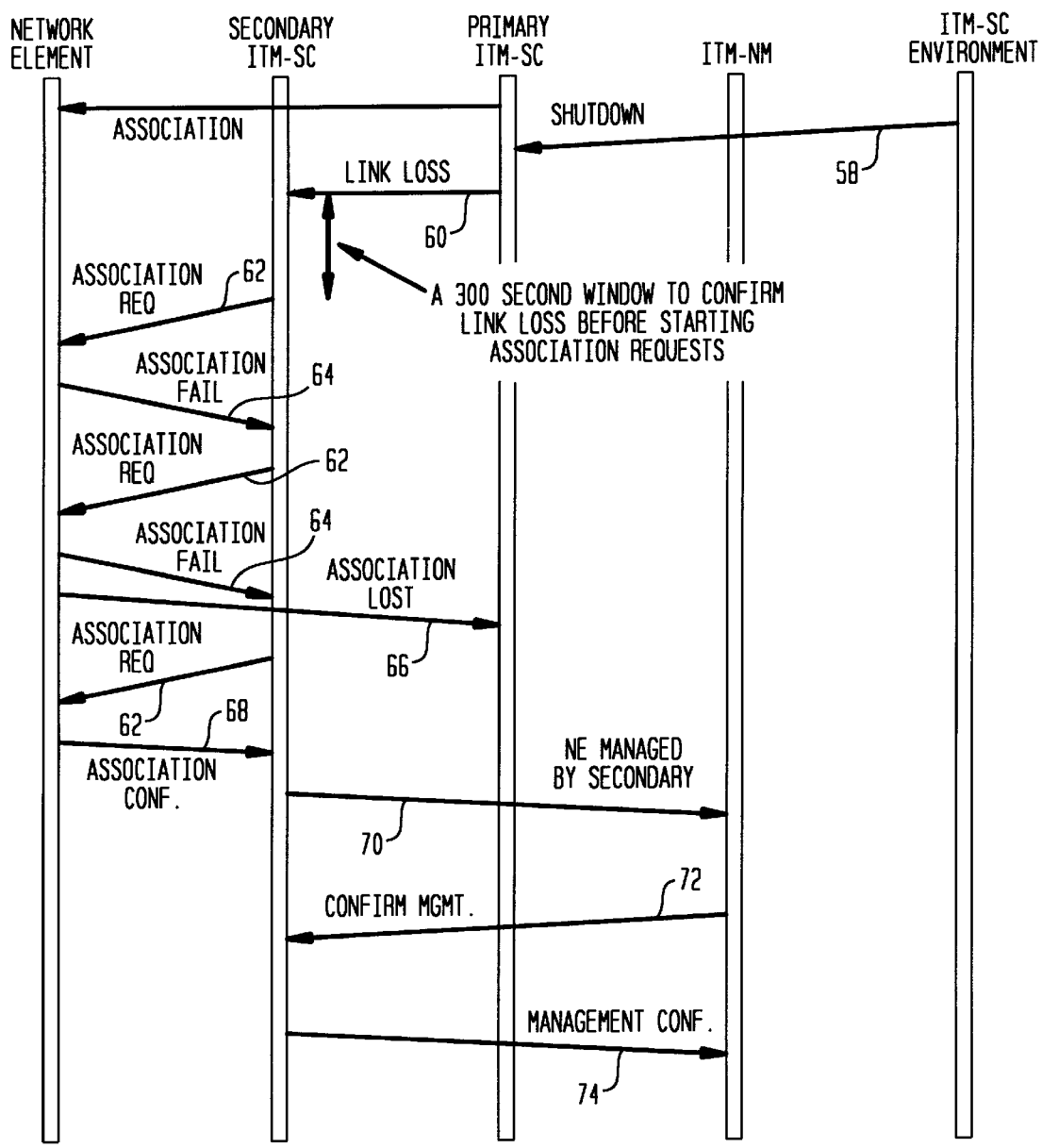
FIG. 9 is a message flow diagram illustrating an exemplary operation in accordance with the present invention when a link between two peer element managers is lost.

FIG. 9 illustrates the management control operation when a secondary ITM-SC cannot confirm operation of the primary ITM-SC of a network element that is in the secondary ITM-SCs secondary domain. This can occur under at least two circumstances, namely, the peer-to-peer link is broken or the primary ITM-SC is at least partially disabled. FIG. 9 illustrates an example wherein the failure is due to an event which disables the primary ITM-SC, as shown at 58.

As previously noted, the peer ITM-SC's communicate with each other via link 19 or 21 by intermittently (e.g., every thirty seconds) polling each other to confirm that they are still operational. If, for example, a secondary ITM-SC polls the primary ITM-SC of that network element and the primary ITM-SC does not respond, as illustrated at 60 in FIG. 9, the secondary ITM-SC will be given 300 seconds to confirm that the primary ITM-SC is not responding. Thus, in our example, in which the secondary ITM-SCs poll the primary ITM-SCs every thirty seconds, ten additional failed polls will need to occur before the secondary ITM-SC will attempt to gain control of the relevant network elements. Once the 300 second period expires without a successful polling operation, the secondary ITM-SC will assume that the link is down. The secondary ITM-SC for a given network element will then attempt to gain association 62 with all of those network elements in its protecting domain which are in the protected domain of the primary ITM-SC by sending association requests 62 to the particular network element. The secondary ITM-SC also changes its geographic redundancy switch status from No Switch to Automatic and its management control status from No Control to expecting management. It should be understood that FIG. 9 shows operation with respect to only one network element, as an example, and that the illustrated operation would be repeated for every network element participating in the geographic redundancy scheme.

In this situation, the network element may not confirm association with the secondary ITM-SC because it may think it is being managed by the primary ITM-SC.

There are at least two common reasons for such a condition. First, the network element may actually still be managed by its primary ITM-SC. For example, the failure of the primary ITM-SC to respond to the polls from the secondary ITM-SC may be due either to a minor failure at the primary ITM-SC that did not affect the primary ITM-SC's ability to control the network element or to a failure in the communication path between the two peer ITM-SCs. Secondly, the network element has not yet determined through normal operation that its primary ITM-SC is non-operational.

Accordingly, it may send back an association fail message 64. The secondary ITM-SC will continue trying and failing unless and until the network element recognizes that it has lost association with its primary ITM-SC, as illustrated at 66. At this point, the network element confirms association via message 68 in response to the next association request 64 from the secondary ITM-SC. Also, if the primary ITM-SC is operational enough to recognize the association loss, it will send a message 67 to the ITM-NM informing it of the association loss. Meanwhile, the secondary ITM-SC, after receiving the association confirmation message 68 will confirm that association to the ITM-NM, as illustrated at 70.

Since the message 70 will be an unsolicited message received out of sequence, the ITM-NM may request confirmation, as shown at 72.

When the primary ITM-SC comes back on line, it will first resynchronize with its peers, i.e., the other ITM-SC's which have network elements in their protecting domains 26 which are in the newly revived ITM-SC's protected domain 24. It will then attempt to associate with those network elements that are in its not protected domain as well as any network elements in its protected domain. OF course, it will receive an abort message from any of those network elements that are actually being managed by their secondary ITM-SCs and therefore will cease attempts to associate therewith.

E. Double Failure

A network element and its primary ITM-SC may lose association while, simultaneously, a peer-to-peer ITM-SC link is down. If the primary ITM-SC is still at least partially operational, it might inform the ITM-NM of the loss of association. However, because the peer-to-peer link is down, the secondary ITM-SC for the network element will simultaneously be trying to gain association with the network element. Assuming that the secondary ITM-SC was successful in gaining association, if that network element's primary ITM-SC attempted to re-confirm association with the network element, it would receive an abort message indicating that the network element now has an association with the secondary ITM-SC. The primary ITM-SC would then change its geographic protection switch status for that network element to Automatic and its management control status to No Control. Particularly, the primary ITM-SC can simply assume that the network element is being managed by the secondary ITM-SC by virtue of the reception of the abort message. The primary ITM-SC shall then discontinue attempts to re-associate with the lost network element until a manual hand-back is undertaken.

When the secondary ITM-SC gains association with the network element, it will change its management control status for that network element to Actively Managed. The protection switch status already is set to Automatic as a result of the link failure.

If and when the peer-to-peer link is re-established between the primary and secondary ITM-SC's, the secondary ITM-SC will send network level data to the primary ITM-SC informing it of updates in the status of the network element. This is done exactly analogously to the situation when the primary ITM-SC is managing an element and sends network level data to the secondary ITM-SC in order to keep it updated.

F. Removing a Network Element From the Geographic Redundancy Scheme

Figure 10:
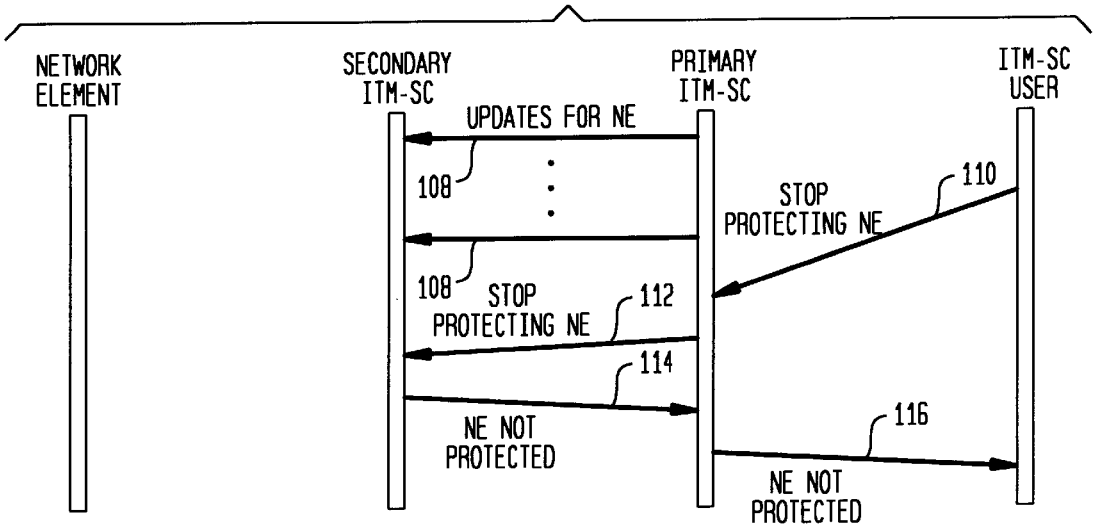
FIG. 10 is a message flow diagram illustrating operation in accordance with the present invention illustrating the removal of a network element from the geographic redundancy scheme of the present invention.

In the preferred embodiment of the invention, a network element can be removed from the geographic redundancy scheme only manually by the ITM-SC user 17. As shown at 108 in the message sequence diagram of FIG. 10, during normal operation in accordance with the geographic redundancy scheme of the present invention, the primary ITM-SC will continually send updates to the network level data of its participating network elements to the secondary ITM-SC responsible for protecting the particular network element. When the network user 17 wishes to remove a network element from the geographic redundancy scheme, the ITM-SC user sends a message 110 to the primary ITM-SC asking it to remove the network element from the geographic redundancy scheme. The primary ITM-SC forwards an instruction 112 to the secondary ITM-SC asking it to remove the network element from its protecting domain. The secondary ITM-SC does so and returns a message 114 to the primary ITM-SC indicating that the network element has been removed. The primary ITM-SC then sends a message 116 back to the ITM-NM which preferably has a GUI (Graphical User Interface) to notify the user 17 that the status has been changed. The secondary ITM-SC also will remove any data about the network element from its database.

Should the peer-to-peer communication link between the primary and secondary ITM-SC's be down at the time when an ITM-SC removes an element from the geographical redundancy scheme, a warning message will be generated and presented to the ITM-SC user through the graphical user interface. The message also will be stored in the system alarm log. The network element's secondary ITM-SC will be informed of the removal when the communication link is re-established as previously described above in the discussion of peer-to-peer loss of communication linkage.

G. Revival of a Previously Disabled Manager

Figure 11:
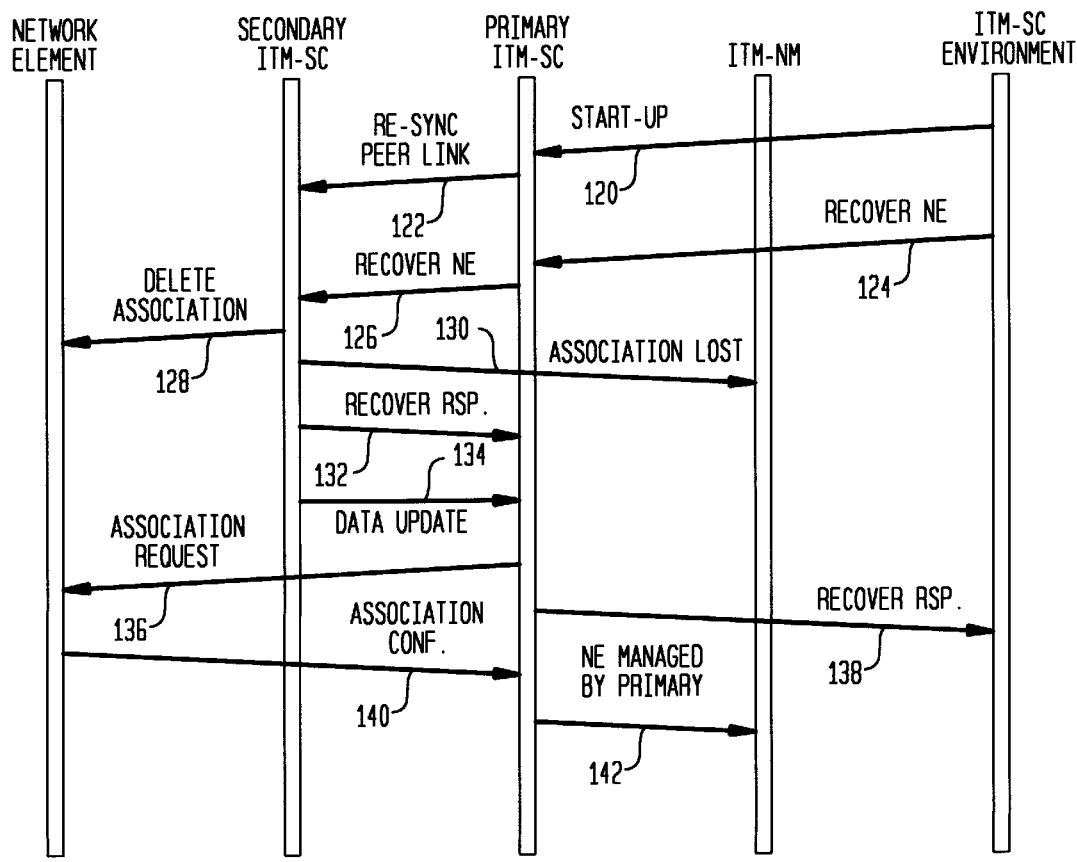
FIG. 11 is a message flow diagram illustrating operation in accordance with the present invention of a secondary element manager returning control to a primary element manager.

FIG. 11 is a message sequence diagram showing an exemplary sequence when an ITM-SC is brought back on line. As illustrated, upon start-up 120, the primary ITM-SC resynchronizes with its peer ITM-SC's. Resynchronization is discussed in co-pending patent application No. 09/140, 273, entitled METHOD AND APPARATUS FOR RE-SYNCHRONIZING A NETWORK MANAGER TO ITS NETWORK AGENTS (Attorney Docket No. Davies 1-1-1), filed on even date herewith, and incorporated herein by reference.

In the preferred embodiment of the invention, upon re-start, an ITM-SC does not automatically attempt to regain association with those network elements which were in its protected domain and which now presumably are being managed by their secondary ITM-SC's. The reason for this preference of a non-revertive scheme is that, with a revertive scheme, it is possible for a network element to be continuously passed back and forth between its primary and secondary ITM-SCs with no management actually occurring.

Preferably, no re-association is attempted until the ITM-SC user 17 sends an instruction 124 to the primary ITM-SC that it should attempt to regain control of a particular network element. The primary ITM-SC then informs the secondary ITM-SC for that network element of its desire to regain control, as shown in message 126. The secondary ITM-SC deletes the association with the network element, as shown at 128. It then also informs the ITM-NM of the loss of association, as shown by message 130 and informs the primary ITM-SC that it has relinquished control, as shown by message 132. It further sends the network element's current network level data to the primary ITM-SC, via message 134. The primary ITM-SC then sends an association request 136 to the network element. It also sends a recover response message 138 to the ITM user. When the primary ITM-SC receives a message 140 from the network element confirming the association request, the primary ITM-SC informs the ITM-NM with a message 142 that it is now actively managing the network element.

H. Manual Geographic Redundancy Switch

Figure 12:
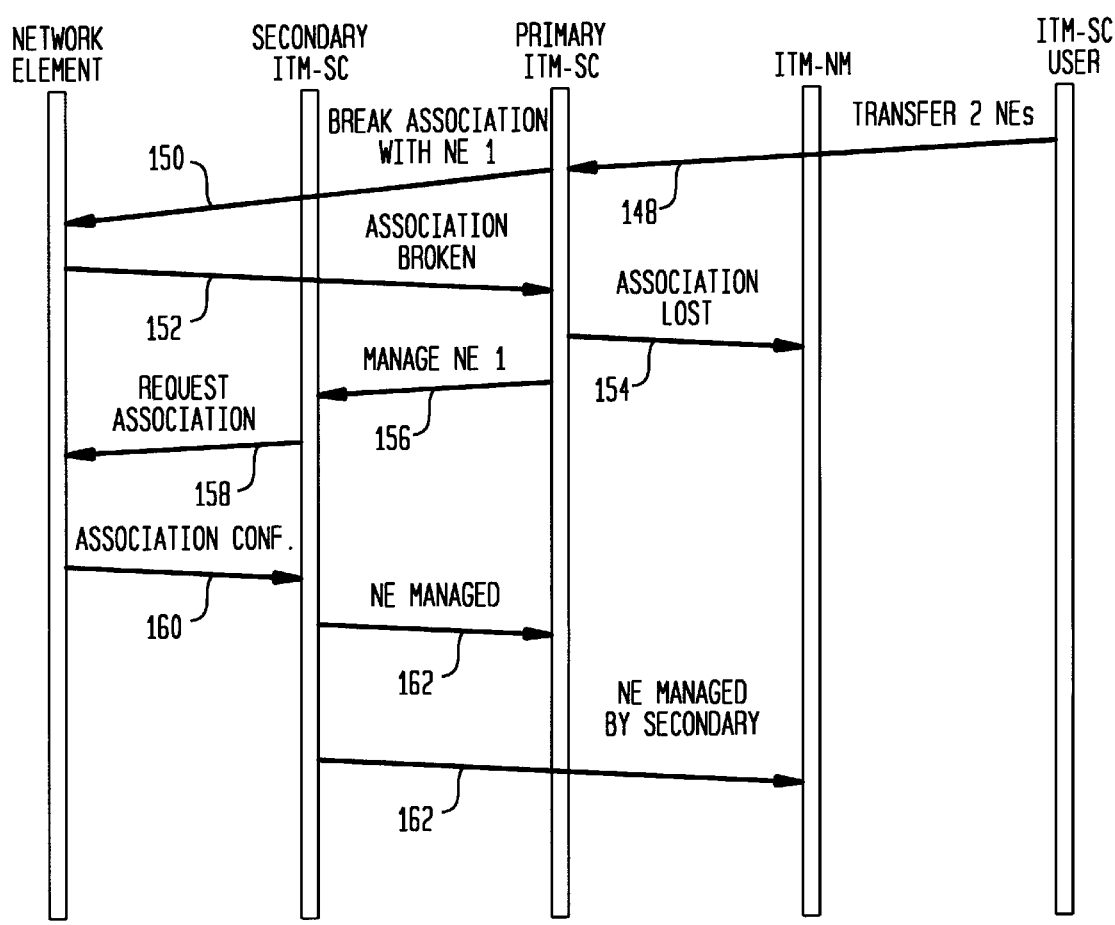
FIG. 12 is a message flow diagram illustrating operation in accordance with the present invention in the event of a manual switch of control of a network element between a primary and a secondary element manager.

FIG. 12 is a message sequence diagram illustrating a control switch in response to a manual request from the ITM-SC user. The operation is essentially the same, with a few exceptions, to the discussion above with respect to an operational primary ITM-SC losing association with a network element. Particularly, the differences are (1) the initiating factor is not the loss of association, but an instruction 148 from the ITM-SC user, and (2) the primary and secondary ITM-SCs change their geographic redundancy protection switch status from No Switch to Manual, rather than from No Switch to Automatic.

FIG. 12 illustrates operation in the event that the primary manager receives an instruction 148 from the user to transfer control of a network element to its secondary ITM-SC. The primary ITM-SC responds by sending a disassociation request 150 to the network element. After the network element responds with an acknowledgement 152 that the association has been broken, the primary ITM-SC reports the loss of association to the network manager, as shown at 154, and requests the secondary ITM-SC of that network element to assume control of the network element, as shown at 156. The network element, presumably, will respond with a confirmation 160. The secondary manager then sends a report 162 to both the primary ITM-SC and the network manager that it is now controlling that network element.

Having described a few particular embodiments of the invention, various other alterations, modifications, and improvements to the invention will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method of controlling a network element in a communications network, said method comprising the steps of:

providing a primary manager coupled over said network to said network element for controlling said network element;

providing a secondary manager coupled over said network to said primary manager and to said network element for assuming control of said first network element if the primary manager is unable to control said network element;

said secondary manager making an initial determination of whether said primary manager is controlling said network element; and if said second manager initially determines that said first manager is not controlling said first network element, said second manager requesting said first network element to allow said second manager to control said network element.

2. A method as set forth in claim 1 wherein the step of providing a secondary manager further comprises:

said second manager storing in a database (1) the identity of said first network element's primary manager and (2) a copy of the primary manager's network data for said network element.

3. A method as set forth in claim 2 further comprising the step of:

providing a high level management node for controlling said primary and secondary managers; and when said secondary manager assumes control of said network element, said secondary manager informing said network management node that it has assumed control of said network element.

4. A method as set forth in claim 3 further comprising the step of:

(4) while said primary manager is controlling said network element, said primary manager reporting to said secondary manager changes in network level data pertaining to said network element.

5. A method as set forth in claim 4 further comprising the steps of:

said network management node requesting said primary and secondary managers to confirm if they are controlling said network element; and only said manager that is presently controlling said network element acknowledging said request.

6. A method as set forth in claim 1 wherein said primary and secondary managers are geographically remote from each other.

7. A method as set forth in claim 1 wherein said primary and secondary managers are at least about 1 mile from each other.

8. A method as set forth in claim 1 wherein said primary and secondary managers are at least about 200 feet from each other.

9. A method as set forth in claim 1 further comprising the step of:

when said secondary manager requests control of said network element, said secondary manager requesting said network element to transmit to said secondary manager its attribute data; and said secondary manager storing attribute data received from said network element.

10. A method as set forth in claim 9 further comprising the step of:

said managers storing a management control status attribute pertaining to said network element, said management control status attribute having three possible states, including a first state indicating that said manager is controlling said network element, a second state indicating that said manager is attempting to gain control of said network element, and a third state indicating that said manager is not controlling said network element and is not expecting to gain control of said network element.

11. A method as set forth in claim 1 wherein said secondary manager is coupled to said network element through said network via a path that does not include said primary manager.

12. A method as set forth in claim 1 wherein said step of making an initial determination further comprises the steps of:

said secondary manager polling said primary manager through said network; and if said primary manager does not respond to said polling, said secondary manager making said initial determination that said primary manager is not controlling said network element.

13. A method as set forth in claim 1 further comprising the steps of:

if said primary manager cannot confirm an association with said network element, said primary manager requesting said secondary manager to assume control of said network element; and wherein said step of making an initial determination comprises, if said secondary manager receives said request from said primary manager, said secondary manager making said initial determination that said primary manager is not controlling said network element.

14. A method as set forth in claim 1 further comprising the steps of:

allowing a user to manually request of said primary manager that control of said network element be transferred to said secondary manager, responsive to said manual request, said primary manager requesting said secondary manager to assume control of said network element; and wherein said step of making an initial determination comprises, if said secondary manager receives said request from said primary manager, said secondary manager making said initial determination that said primary manager is not controlling said network element.

15. A method as set forth in claim 14 further comprising the step of:

said primary manager storing a geographic redundancy status attribute pertaining to said network element, said geographic redundancy status attribute having three possible states, including a first state indicating that said network element has a secondary manager that can assume control of said network element, a second state indicating that said network element does not have a secondary manager that can assume control of said network element, and a third state indicating that said manager has a secondary manager, but that the secondary manager is presently disabled from assuming control of said network element.

16. A method as set forth in claim 14 further comprising the step of:

said secondary manager storing a geographic redundancy status attribute pertaining to said network element, said geographic redundancy status attribute having two possible states, including a first state indicating that said secondary manager is a secondary manager for said network element and can control it if the primary manager does not, and a second state indicating that said secondary manager is a secondary manager for said network element, but that said secondary manager is presently disabled from assuming control of said network element.

17. A method as set forth in claim 16 further comprising the step of:
said managers storing a protection switch status attribute pertaining to said network element, said protection switch status attribute having three possible states, including a first state indicating that said primary manager is expected to be controlling said network element, a second state indicating that there has been a manual request for the secondary manager to assume control of said network element, and a third state indicating that there has been a request other than a manual request for said secondary manager to assume control of said network element.

18. A method as set forth in claim 17 wherein, after said secondary manager has assumed control of said network element, control can be returned to said primary manager only by a manual request from a user of said network.

19. A method of controlling network elements in a communications network comprising a plurality of managers, each said manager controlling a plurality of network elements, said method comprising the steps of:
assigning a first manager as the primary manager for controlling at least a first set of network elements;
assigning a second manager as the primary manager for controlling at least a second set of network element;
assigning said second manager as a secondary manager of at least a first one of said network elements in said first set of network elements, said second manager being responsible for controlling said first network element if said first manager is unable to control said first network element;
upon said assignment of said secondary manager as a secondary manager of said first network element, said first manager providing to said second manager (1) the identity of said first network element's primary manager and (2) a copy of the primary manager's network level data for said first network element;
said second manager storing the identity of said first network element's primary manager and a copy of the primary manager's network data for the given network element;
said second manager making an initial determination of whether said primary manager is controlling said first network element;
if said second manager initially determines that said first manager is not controlling said first network element, said second manager requesting said first network element to allow said second manager to control said first network element; and
if said network element allows said second manager to control it, said second manager thereafter controlling said network element.

20. A method of controlling network elements in a communications network comprised of a plurality of managers, each said manager being a primary manager for controlling a plurality of network elements, said method comprising the steps of:
assigning a plurality of said managers each as a secondary manager of at least a set of said network elements, said secondary managers being responsible for controlling any one or more of said network elements for which it is a secondary manager if said manager that is primary manager thereof is unable to control said network element;
upon assignment of a secondary manager for a particular network element, said manager that is the primary manager for said particular network element providing to said manager that is the secondary manager for said particular network element the identity of said network element's primary manager and a copy of the primary manager's network data for the particular network element;
said manager that is the secondary manager for said particular network element storing the identity of said first network element's primary manager and a copy of the network data for the particular network element received from said primary manager of said particular network element;
said secondary manager making an initial determination of whether said primary manager is controlling said network element;
if said secondary manager for said network element initially determines that said primary manager for said particular network element is not controlling said network element, said secondary manager for said particular network element requesting said particular network element to allow said secondary manager to control said particular network element; and
if said network element allows said secondary manager to control it, said secondary manager thereafter controlling said network element.

21. A method as set forth in claim 20 wherein said step of assigning a manager as a secondary manager of a network element further comprises the step of;
said primary manager for said network element providing to said secondary manager for said network element the identity of said first network element's primary manager and a copy of the primary manager's network level data for said network element.

22. A method as set forth in claim 20 further comprising the steps of:
providing a high level management node for controlling said plurality of managers; and
when a manager assumes control of a network element as a secondary manager, said manager informing said network management node that it has assumed control of said network element.

23. A method as set forth in claim 22 further comprising the step of:
while a primary manager for a network element is controlling said network element, said primary manager reporting to said secondary manager changes in network level data pertaining to said network element.

24. A method as set forth in claim 23 further comprising the steps of:
said network management node requesting one or more of said managers to confirm if they are controlling a particular network element; and
only said manager that is presently controlling said network element acknowledging said request.

25. A method as set forth in claim 20 wherein the primary manager for a network element and the secondary manager for said network element are geographically remote from each other.

26. A method as set forth in claim 20 wherein the primary manager for a network element and the secondary manager for said network element are at least about 1 mile from each other.

27. A method as set forth in claim 20 wherein the primary manager for a network element and the secondary manager for said network element are at least about 200 feet from each other.

28. A method as set forth in claim 20 further comprising the step of:
   when a secondary manager for a network element requests control of said network element, said secondary network element requesting said network element to transmit to said secondary manager its attribute data; and
   said secondary manager storing said attribute data received from said network element.

29. A method as set forth in claim 28 further comprising the step of:
   said managers storing a management control status attribute pertaining to each said network elements for which it is a primary manager or a secondary manager, said management control status attribute having three possible states, including a first state indicating that said manager is controlling said network element, a second state indicating that said manager is attempting to gain control of said network element, and a third state indicating that said manager is not controlling said network element and is not expecting to gain control of said network element.

30. A method as set forth in claim 20 wherein each manager that is a secondary manager for a particular network element is coupled to said network element through said network via a path that does not include said primary manager for said particular network element.

31. A method as set forth in claim 20 further comprising the steps of:
   said secondary manager polling the primary manager for each network element for which it is a secondary manager to determine if said primary managers are operational;
   if a polled primary manager does not respond to said polling, said secondary manager making said initial determination that said primary manager is not controlling said network element.

32. A method as set forth in claim 20 further comprising the steps of:
   if a first manager cannot confirm an association with a particular network element for which it is a primary manager and for which there is a secondary manager, said first manager requesting said secondary manager for said particular network element to assume control of said network element;
   if said secondary manager receives said request from said first manager, said secondary manager making said initial determination that said primary manager is not controlling said particular network element.

33. A method as set forth in claim 20 further comprising the steps of;
   allowing a user to manually request of a manager that control of a particular network element for which said manager is a primary manager be transferred to said particular network element's secondary manager;
   responsive to said manual request, said manager requesting said secondary network for said particular network element's secondary manager to assume control of said network element; and
   if said secondary manager receives said request from said primary manager, said secondary manager making said initial determination that said primary manager is not controlling said particular network element.

34. A method as set forth in claim 33 further comprising the step of:
   said managers storing for each network element in its first set of network elements a geographic redundancy status attribute pertaining to said network elements for which it is a primary manager, said geographic redundancy status attribute having three possible states, including a first state indicating that said manager has a secondary manager that can assume control of said network element, a second state indicating that said network element does not have a secondary manager that can assume control of said network element, and a third state indicating that said manager has a secondary manager, but that the secondary manager is presently disabled from assuming control of said network element.

35. A method as set forth in claim 34 further comprising the step of:
   said managers storing for each network element in its second set of network elements a geographic redundancy status attribute pertaining to said network element, said geographic redundancy status attribute having two possible states, including a first state indicating that said secondary manager is a secondary manager for said network element and can control it if the primary manager does not, and a second state indicating that said secondary manager is a secondary manager for said network element, but that said secondary manager is presently disabled from assuming control of said network element.

36. A method as set forth in claim 35 further comprising the step of;
   said managers storing a protection switch status attribute pertaining to said network elements for which it is a primary manager or a secondary manager, said protection switch status attribute having three possible states, including a first state indicating that said primary manager is expected to be controlling said network element, a second state indicating that there has been a manual request for the secondary manager to assume control of said network element, and a third state indicating that there has been a request other than a manual request for said secondary manager to assume control of said network element.

37. An apparatus for controlling network elements in a communications network comprising:
   a plurality of network elements;
   a plurality of managers, each for controlling a first set of said network elements as the primary manager for each network element in said first set;
   a plurality of said managers each serving as a secondary manager for at least a second set of said network elements, said secondary managers being responsible for controlling any one or more of said network elements in its said second set if any of said managers that are primary managers therefor are unable to control said network elements;
   said secondary managers storing, for each network element in its second set, the identity of said network element's primary manager and a copy of the network data for said network element received from said primary manager of said network element;
   each said secondary manager having means for making an initial determination of whether a network element in its second set is being controlled by another network element;
   each said secondary manager having means for requesting each said network element in its second set of network elements to acknowledge said secondary manager as its manager, if said secondary manager makes an initial determination that a network element is not being controlled by another manager.

38. An apparatus as set forth in claim 37 further comprising:
   a high level network management node for controlling said plurality of managers; and
   means associated with each said manager for informing said high level network management node that it is controlling said network element.

39. An apparatus as set forth in claim 38 further comprising:
   means associated with each manager for reporting changes in network level data pertaining to each network element in said manager's first set of network elements to said secondary manager for each said network element.

40. An apparatus as set forth in claim 37 wherein the primary manager for a network element and the secondary manager for said network element are geographically remote from each other.

41. An apparatus as set forth in claim 37 wherein the primary manager for a network element and the secondary manager for said network element are at least about 1 mile from each other.

42. An apparatus as set forth in claim 37 wherein the primary manager for a network element and the secondary manager for said network element are at least about 200 feet from each other.

43. An apparatus as set forth in claim 37 further comprising:
   each said secondary manager having means for requesting a network element in its second set of network elements to transmit to said secondary manager its attribute data when said secondary manager assumes control of said network element; and
   said secondary manager having a storage medium for storing said attribute data.

44. An apparatus as set forth in claim 43 further comprising:
   each said manager having a storage medium for storing a management control status attribute pertaining to each said network elements for which it is a primary manager or a secondary manager, said management control status attribute having three possible states, including a first state indicating that said manager is controlling said network element, a second state indicating that said manager is attempting to gain control of said network element, and a third state indicating that said manager is not controlling said network element and is not expecting to gain control of said network element.

45. An apparatus as set forth in claim 37 wherein each manager that is a secondary manager for a network element is coupled to said network element through said network via a path that does not include said primary manager for said network element.

46. An apparatus as set forth in claim 37 further comprising:
   each of said secondary managers having means for polling the primary manager for each network element in its second set of network elements to determine if said primary managers are operational; and
   each of said secondary managers having means for making said initial determination that said primary manager is not controlling said network element, if a polled primary manager does not respond to said polling.

47. An apparatus as set forth in claim 37 further comprising;
   each manager having means for requesting the secondary manager for a network element in said manager's first set of network elements to assume control of a network element with which said manager cannot confirm an association.

48. An apparatus as set forth in claim 37 further comprising:
   means for allowing a user to manually request of a manager that control of a network element in said managers first set of network elements be transferred to the secondary manager for said network element; and
   means associated with said managers, responsive to said manual request, to request said secondary manager to assume control of said network element.

49. An apparatus as set forth in claim 48 further comprising:
   each said manager having a storage medium for storing a geographic redundancy status attribute pertaining to each said network element in its first set of network elements, said geographic redundancy status attribute having three possible states, including a first state indicating that said manager has a secondary manager that can assume control of said network element, a second state indicating that said network element does not have a secondary manager that can assume control of said network element, and a third state indicating that said manager has a secondary manager, but that the secondary manager is presently disabled from assuming control of said network element.

50. An apparatus as set forth in claim 49 further comprising:
   each said secondary manager having a storage medium for storing a geographic redundancy status attribute pertaining to each said network element in its second set of network elements, said geographic redundancy status attribute having two possible states, including a first state indicating that said secondary manager is a secondary manager for said network element and can control it if the primary manager of said network element does not, and a second state indicating that said secondary manager is a secondary manager for said network element, but that said secondary manager is presently disabled from assuming control of said network element.

51. An apparatus as set forth in claim 50 further comprising;
   each said manager having a storage medium for storing a protection switch status attribute pertaining to said network elements for which it is a primary manager or a secondary manager, said protection switch status attribute having three possible states, including a first state indicating that said primary manager is expected to be controlling said network element, a second state indicating that there has been a manual request for the secondary manager to assume control of said network element, and a third state indicating that there has been a request other than a manual request for said secondary manager to assume control of said network element.

52. A method as set forth in claim 49 wherein, after a secondary manager has assumed control of said network element, control can be returned to said primary manager only by a manual request from a user of said network.

* * * * *